(12) United States Patent
Angelo et al.

(10) Patent No.: US 11,693,120 B2
(45) Date of Patent: Jul. 4, 2023

(54) SYSTEM AND METHOD FOR PROVIDING GNSS CORRECTIONS

(71) Applicant: Swift Navigation, Inc., San Francisco, CA (US)

(72) Inventors: Joseph Angelo, San Francisco, CA (US); Leith Bade, San Francisco, CA (US); Sébastien Carcanague, San Francisco, CA (US)

(73) Assignee: Swift Navigation, Inc., San Francisco, CA (US)

( * ) Notice: Subject to any disclaimer, the term of this patent is extended or adjusted under 35 U.S.C. 154(b) by 0 days.

(21) Appl. No.: 17/884,254

(22) Filed: Aug. 9, 2022

(65) Prior Publication Data

US 2023/0043489 A1 Feb. 9, 2023

Related U.S. Application Data

(60) Provisional application No. 63/230,960, filed on Aug. 9, 2021.

(51) Int. Cl.
*G01S 19/07* (2010.01)

(52) U.S. Cl.
CPC .................. *G01S 19/072* (2019.08)

(58) Field of Classification Search
USPC ....................................... 342/367.4
See application file for complete search history.

(56) References Cited

U.S. PATENT DOCUMENTS 5,490,076 A * 2/1996 Rawicz ............... H04B 10/118
701/472

5,610,614 A 3/1997 Talbot et al.
(Continued)

FOREIGN PATENT DOCUMENTS

| CN | 103760573 A | 4/2014 |
| CN | 104236522 A * | 12/2014 ............. G01C 11/00 |

(Continued)

OTHER PUBLICATIONS

"An Introduction to GNSS, Chapter 4, GNSS Error Sources", https://novatel.com/an-introduction-to-gnss/chapter-4-gnsserror-sources, published 2015.

(Continued)

*Primary Examiner* — Erin F Heard
*Assistant Examiner* — Michael W Justice
(74) *Attorney, Agent, or Firm* — Jeffrey Schox; Randy Mehlenbacher

(57) ABSTRACT

A method for disseminating corrections can include receiving a set of satellite observations at a GNSS receiver; transmitting the corrections to the GNSS receiver, wherein the corrections; and determining a position of the GNSS receiver, wherein the set of satellite observations are corrected using the corrections. A system for disseminating corrections can include a positioning engine operating on a computing system collocated with a GNSS antenna; and a corrections generator operating on a computing system remote from the GNSS antenna, wherein the corrections generator is configured to transmit corrections to the positioning engine, wherein the positioning engine is configured to determine a high accuracy position of the GNSS antenna using the corrections, wherein the corrections are rebroadcast to the positioning engine with a time period less than an update time period for changing the corrections.

16 Claims, 6 Drawing Sheets

(56) References Cited

U.S. PATENT DOCUMENTS

| | | | |
|---|---|---|---|
| 6,427,122 B1 | 7/2002 | Lin | |
| 6,453,237 B1 | 9/2002 | Fuchs et al. | |
| 6,552,680 B1 | 4/2003 | Barber et al. | |
| 6,647,340 B1 | 11/2003 | Pemble et al. | |
| 6,691,066 B1 | 2/2004 | Brodie | |
| 6,799,116 B2* | 9/2004 | Robbins | G01S 5/009 |
| | | | 73/178 R |
| 6,816,117 B2* | 11/2004 | Fink | G01S 19/55 |
| | | | 342/464 |
| 6,856,905 B2 | 2/2005 | Pasturel et al. | |
| 6,864,836 B1 | 3/2005 | Hatch et al. | |
| 7,026,982 B2 | 4/2006 | Toda et al. | |
| 7,219,013 B1 | 5/2007 | Young et al. | |
| 7,289,061 B2 | 10/2007 | Komjathy et al. | |
| 7,292,183 B2 | 11/2007 | Bird et al. | |
| 7,298,325 B2* | 11/2007 | Krikorian | H01Q 19/132 |
| | | | 342/359 |
| 7,382,313 B1* | 6/2008 | Goad | G01S 19/36 |
| | | | 342/357.76 |
| 7,409,289 B2 | 8/2008 | Coatantiec et al. | |
| 7,692,578 B2 | 4/2010 | Vollath et al. | |
| 7,696,922 B2 | 4/2010 | Nicholson et al. | |
| 8,089,402 B2* | 1/2012 | Maenpa | G01S 19/23 |
| | | | 342/357.62 |
| 8,094,065 B2 | 1/2012 | Henkel | |
| 8,193,976 B2 | 6/2012 | Shen et al. | |
| 8,255,155 B1 | 8/2012 | Crane et al. | |
| 8,447,517 B2 | 5/2013 | Roh | |
| 8,542,146 B2 | 9/2013 | Vollath | |
| 8,587,475 B2* | 11/2013 | Leandro | G01S 19/40 |
| | | | 342/357.27 |
| 8,610,624 B2 | 12/2013 | Savoy | |
| 8,756,001 B2 | 6/2014 | Georgy et al. | |
| 8,760,343 B2 | 6/2014 | Milyutin et al. | |
| 8,825,456 B2 | 9/2014 | Vasudevan et al. | |
| 8,860,609 B2 | 10/2014 | Roh | |
| 8,996,311 B1 | 3/2015 | Morin et al. | |
| 9,031,782 B1 | 5/2015 | Lemay et al. | |
| 9,069,073 B2 | 6/2015 | Ramakrishnan et al. | |
| 9,128,176 B2 | 9/2015 | Seeger | |
| 9,182,497 B2 | 11/2015 | Geier et al. | |
| 9,405,012 B2 | 8/2016 | Doucet et al. | |
| 9,405,016 B2 | 8/2016 | Yim | |
| 9,417,330 B2* | 8/2016 | Revol | G01S 19/22 |
| 9,557,422 B1 | 1/2017 | Miller et al. | |
| 9,568,321 B2 | 2/2017 | Bharadwaj et al. | |
| 9,602,974 B2 | 3/2017 | Rudow et al. | |
| 9,612,341 B2 | 4/2017 | Large et al. | |
| 9,709,683 B2 | 7/2017 | Leandro et al. | |
| 9,784,844 B2 | 10/2017 | Kana et al. | |
| 9,857,474 B2* | 1/2018 | Tan | G01S 19/258 |
| 10,018,729 B2 | 7/2018 | Dunik et al. | |
| 10,101,464 B2 | 10/2018 | Appleford et al. | |
| 10,191,157 B2* | 1/2019 | Dai | G01S 19/44 |
| 10,260,888 B2 | 4/2019 | Takahashi | |
| 10,274,606 B1 | 4/2019 | Phan et al. | |
| 10,422,885 B2* | 9/2019 | Dai | G01S 19/44 |
| 10,459,593 B2 | 10/2019 | Tiwari et al. | |
| 10,578,747 B2 | 3/2020 | Grgich et al. | |
| 10,677,933 B1 | 6/2020 | Gavrilets et al. | |
| 10,802,160 B2* | 10/2020 | Dai | G01S 19/25 |
| 10,809,388 B1 | 10/2020 | Carcanague et al. | |
| 10,901,096 B2* | 1/2021 | Thrasher | G01S 19/44 |
| 11,156,718 B2 | 10/2021 | Takeda | |
| 11,187,813 B2 | 11/2021 | Brandl et al. | |
| 11,255,976 B2* | 2/2022 | Strobel | G01S 19/072 |
| 11,327,182 B2* | 5/2022 | Zalewski | G01S 19/36 |
| 11,422,269 B2* | 8/2022 | Ookubo | G01S 19/04 |
| 11,422,271 B2 | 8/2022 | Talbot et al. | |
| 2002/0180641 A1* | 12/2002 | Fink | H01Q 21/06 |
| | | | 342/464 |
| 2005/0001762 A1 | 1/2005 | Han et al. | |
| 2005/0001763 A1 | 1/2005 | Han et al. | |
| 2005/0024263 A1 | 2/2005 | Sharpe et al. | |
| 2005/0114023 A1 | 5/2005 | Williamson et al. | |
| 2007/0126629 A1* | 6/2007 | Krikorian | H01Q 19/132 |
| | | | 342/359 |
| 2008/0205521 A1 | 8/2008 | Van | |
| 2009/0018772 A1 | 1/2009 | Watanabe et al. | |
| 2009/0184869 A1 | 7/2009 | Talbot et al. | |
| 2009/0273511 A1 | 11/2009 | Schroth | |
| 2010/0033370 A1 | 2/2010 | Lopez et al. | |
| 2010/0164789 A1 | 7/2010 | Basnayake | |
| 2010/0283675 A1 | 11/2010 | Mcaree et al. | |
| 2011/0050497 A1* | 3/2011 | Maenpa | G01S 19/23 |
| | | | 342/368 |
| 2011/0090116 A1 | 4/2011 | Hatch et al. | |
| 2011/0122022 A1 | 5/2011 | Van et al. | |
| 2011/0140959 A1 | 6/2011 | Vollath | |
| 2011/0148698 A1 | 6/2011 | Vollath | |
| 2011/0187589 A1 | 8/2011 | Gaal et al. | |
| 2011/0187590 A1* | 8/2011 | Leandro | G01S 19/43 |
| | | | 342/357.27 |
| 2011/0316740 A1* | 12/2011 | Waters | G01S 19/235 |
| | | | 342/357.63 |
| 2012/0154210 A1 | 6/2012 | Landau et al. | |
| 2012/0176271 A1 | 7/2012 | Dai et al. | |
| 2013/0050020 A1 | 2/2013 | Peck et al. | |
| 2013/0099970 A1 | 4/2013 | Lin et al. | |
| 2013/0227377 A1 | 8/2013 | Rao et al. | |
| 2013/0234885 A1 | 9/2013 | Geier et al. | |
| 2013/0265191 A1 | 10/2013 | Ghinamo | |
| 2013/0271318 A1 | 10/2013 | Landau et al. | |
| 2013/0335264 A1* | 12/2013 | Revol | G01S 19/42 |
| | | | 342/357.25 |
| 2014/0015712 A1 | 1/2014 | Leandro et al. | |
| 2014/0062765 A1 | 3/2014 | Brenner | |
| 2014/0062776 A1* | 3/2014 | Ferguson | G01S 19/072 |
| | | | 342/357.41 |
| 2014/0184442 A1 | 7/2014 | Large et al. | |
| 2014/0232592 A1 | 8/2014 | Psiaki et al. | |
| 2014/0240172 A1 | 8/2014 | Milyutin et al. | |
| 2014/0266876 A1* | 9/2014 | Tan | G01S 19/05 |
| | | | 342/357.42 |
| 2015/0019464 A1 | 1/2015 | Nguyen-Tuong et al. | |
| 2015/0168559 A1* | 6/2015 | Salazar | G06F 30/00 |
| | | | 703/1 |
| 2015/0260848 A1 | 9/2015 | Mundt et al. | |
| 2015/0270615 A1* | 9/2015 | Neenan | H01Q 9/42 |
| | | | 343/700 MS |
| 2015/0293230 A1 | 10/2015 | Weed et al. | |
| 2015/0293233 A1 | 10/2015 | Dejong | |
| 2015/0369924 A1* | 12/2015 | Hedgecock | G01S 19/51 |
| | | | 342/357.34 |
| 2016/0011318 A1 | 1/2016 | Cohen | |
| 2016/0097859 A1 | 4/2016 | Hansen et al. | |
| 2016/0195617 A1 | 7/2016 | Phatak et al. | |
| 2017/0269216 A1* | 9/2017 | Dai | G01S 19/25 |
| 2017/0269222 A1 | 9/2017 | Dai et al. | |
| 2017/0269231 A1* | 9/2017 | Dai | G01S 19/32 |
| 2017/0299730 A1* | 10/2017 | Lie | G01S 19/426 |
| 2017/0299731 A1* | 10/2017 | Lie | G01S 19/44 |
| 2017/0322313 A1 | 11/2017 | Revol et al. | |
| 2018/0113219 A1 | 4/2018 | Wuebbena | |
| 2018/0120445 A1 | 5/2018 | Dill | |
| 2018/0164442 A1* | 6/2018 | Thrasher | G01S 19/54 |
| 2018/0172838 A1 | 6/2018 | Junker et al. | |
| 2018/0246217 A1* | 8/2018 | Wuebbena | G01S 19/40 |
| 2018/0252818 A1* | 9/2018 | Sato | G01S 19/08 |
| 2018/0283882 A1 | 10/2018 | He et al. | |
| 2018/0299562 A1 | 10/2018 | Green | |
| 2018/0306930 A1 | 10/2018 | Laine et al. | |
| 2019/0004180 A1 | 1/2019 | Jokinen | |
| 2019/0154837 A1 | 5/2019 | Noble et al. | |
| 2019/0187295 A1 | 6/2019 | Lee et al. | |
| 2019/0187298 A1 | 6/2019 | Grgich et al. | |
| 2019/0204450 A1 | 7/2019 | Revol | |
| 2019/0243001 A1* | 8/2019 | Ookubo | G01S 19/04 |
| 2019/0302274 A1 | 10/2019 | Berntorp et al. | |
| 2019/0339396 A1 | 11/2019 | Turunen | |
| 2020/0025936 A1 | 1/2020 | Zhou et al. | |
| 2020/0025937 A1 | 1/2020 | Kroeger et al. | |

(56) References Cited

U.S. PATENT DOCUMENTS

| | | | |
|---|---|---|---|
| 2020/0041654 | A1 | 2/2020 | Noble et al. |
| 2020/0096649 | A1 | 3/2020 | Brandl et al. |
| 2020/0209406 | A1 | 7/2020 | Lin et al. |
| 2020/0233056 | A1 | 7/2020 | Dolgov et al. |
| 2020/0257002 | A1 | 8/2020 | Henkel |
| 2021/0033735 | A1 | 2/2021 | Kleeman |
| 2021/0116579 | A1 | 4/2021 | Rezaei |
| 2021/0165104 | A1* | 6/2021 | Zalewski ............... G01S 19/36 |
| 2021/0165111 | A1* | 6/2021 | Zalewski ............... G01S 19/47 |
| 2021/0215831 | A1* | 7/2021 | Takeda .................. G01S 19/23 |
| 2022/0058322 | A1 | 2/2022 | Brandl et al. |
| 2022/0163677 | A1* | 5/2022 | Muthuraman ........ G01S 19/071 |

FOREIGN PATENT DOCUMENTS

| | | |
|---|---|---|
| CN | 104732085 A | 6/2015 |
| CN | 105629263 B | 4/2019 |
| CN | 107422354 B | 6/2019 |
| CN | 109714421 B | 8/2021 |
| CN | 114174850 A | 3/2022 |
| EP | 0244091 A2 | 11/1987 |
| EP | 1729145 A1 | 12/2006 |
| EP | 2128841 A1 | 12/2009 |
| EP | 2602752 A1 | 6/2013 |
| EP | 1839070 B2 | 4/2014 |
| EP | 2966477 A1 | 1/2016 |
| EP | 3627188 A1 | 3/2020 |
| EP | 3566021 B1 | 3/2021 |
| KR | 101181990 B1 | 9/2012 |
| WO | 02061449 A1 | 8/2002 |
| WO | 2017046914 A1 | 3/2017 |
| WO | 2017070732 A1 | 5/2017 |
| WO | 2018188845 A1 | 10/2018 |
| WO | 2020240307 A1 | 12/2020 |

OTHER PUBLICATIONS

"Geo++ SSR For Network-RTK, PPP and PPP-RTK", https://geopp.de/wp-content/uploads/2020/09/SSR_Flyer_v3.pdf, Sep. 2015.

"IGS State Space Representation (SSR) Format Version 1.00", International GNSS Service (IGS), Oct. 5, 2020.

"Integrity-Navipedia", https://gssc.esa.int/navipedia/index.php/Integrity, published 2011.

"Phase II of the GNSS Evolutionary Architecture Study", https://www.faa.gov/about/office_org/headquarters_offices/ato/service_units/techops/navservices/gnss/library/documents/media/geasphaseii_final.pdf, Feb. 2010.

"RAIM", GMV, 2011, RAIM.

"Safe Position Augmentation for Real-Time Navigation (SPARTN) Interface Control Document Version 1.8.0", Jan. 2020, Sapcorda Services GmbH.

"Swift Navigation Binary Protocol", Version 3.4.5, Mar. 10, 2021, pp. 1-156.

Altmayer, Christian , "Cycle Slip Detection and Correction by Means of Integrated Systems", ION Institute of Navigation, Proceedings of the 200 National Technical Meeting of the Institute of Navigation, Abstract, Jan. 26-28, 2000.

Blanch, Juan , et al., "RAIM with Optimal Integrity and Continuity Allocations Under Multiple Failures", IEEE Transactions on Aerospace and Electronic Systems, vol. 46, No. 3, Jul. 2010.

Brack, A., "Optimal Estimation of a Subset of Integers With Application to GNSS", Artificial Satellites, vol. 51, No. 4—2016 DOI: 10.1515/arsa-2016-0011.

Brocard, Philippe , "Integrity monitoring for mobile users in urban environment", https://tel.archives-ouvertes.fr/tel-01379632/ document, submitted Oct. 11, 2016.

Bruno, Jon , et al., "A realistic simulation framework to evaluate ionospheric tomography", Advances in Space Research 65 (2020) 891-901.

Dassel, Ryan , "Real-Time ARAIM Using GPS, GLONASS and GALILEO", Submitted in partial fulfillment of the requirements for the degree of Master of Science in Mechanical and Aerospace Engineering in the Graduate College of the Illinois Institute of Technology, May 2017.

Chiu, David S., et al., "Bierman-Thorton UD Filtering for Double-Differenced Carrier Phase Estimation Accounting for Full Mathematical Correlation", Jan. 2008, ION NTM 2008, pp. 756-762., Jun. 23, 2017 00:00:00:0.

Davidson, Pavel , et al., "Improved Vehicle Positioning in Urban Environment through Integration of GPS and Low-Cost Inertial Sensors", European Navigation Conference, ENC-GNSSAt: Naples, Italy, May 2009.

Drescher, Ralf , "Fast convergence of Trimble CenterPoint RTX by regional augmentation", Trimble Terrasat GmbJ, Munich, EGU General Assembly 2015, Vienna, Thursday, Apr. 16, 2015.

Favey, Etienne , et al., "Dead reckoning fills-in GPS navigation gap", EE Times, Automotive Designline, Aug. 18, 2011.

Feng, Shaun , et al., "Carrier phase-based integrity monitoring for high-accuracy positioning", GPS Solution, Apr. 2009.

Gratton, Livio , et al., "Carrier Phase Relative RAIM Algorithms and Protection Level Derivation", Journal of Navigation (2010), 63, 215-231, doi: 10.1017/S0373463309990403.

Gunning, Kazuma , et al., "Design and evaluation of integrity algorithms for PPP in kinematic applications", Proceedings of the 31st International Technical Meeting of the Satellite Division of The Institute of Navigation (ION GNSS+ 2018) Sep. 24-28, 2018, Hyatt Regency Miami, Miami, Florida.

Henkel, Patrick, et al., "Joint L-/C-Band Code and Carrier Phase Linear Combinations for Galileo", International Journal of Navigation and Observation, vol. 2008, Article ID 651437, 8 pages.

Hirokawa, DR. Rui , "Recent Activity of International Standardization for High-Accuracy GNSS Correction Service", Mitsubishi Electric, Jun. 27, 2019.

Huang, Panpan , "Airborne GNSS PPP Based Pseudolite System", School of Civil and Environmental Engineering Faculty of Engineering UNSW. Jun. 2019.

Karaim, Malek , et al., "GNSS Error Sources", https://www.intechopen.com/books/multifunctional-operation-and-application-of-gps/gnss-error-sources, published Apr. 6, 2018.

Khanafseh, Samer , et al., "GNSS Multipath Error Modeling for Automotive Applications", Abstract only, Proceedings of the 31st International Technical Meeting of the Satellite Division of The Institute of Navigation (ION GNSS+ 2018), Miami, Florida, Sep. 2018, pp. 1573-1589, https://www.ion.org/publications/abstract.cfm?articleID=16107.

Kilic, Cagri , et al., "ZUPT Aided GNSS Factor Graph with Inertial Navigation Integration for Wheeled Robots", Proceedings of the 34th International Technical Meeting of the Satellite Division of The Institute of Navigation (ION GNSS+ 2021) Sep. 20-24, 2021.

Kissai, Ali , et al., "UAV Dead Reckoning with and without using INS/ GPS Integrated System in GPS denied Polar Region", International Journal of Aeronautics and Aerospace Engineering, ISSN: 2643-8224, 10 pages, published Aug. 26, 2019.

Ko, Jonathan , et al., "GP-UKF: Unscented kalman filters with Gaussian process prediction and observation models", Conference Paper, Dec. 2007,10.1109/IROS.2007.4399284.

Kuusniemi, Heidi, et al., "GNSS Signal Reliability Testing in Urban and Indoor Environments", Proceedings of NTM 2004 Conference (Session A2), San Diego, CA, Jan. 26-28, 2004, The Institute of Navigation.

Lee, Jae Ho , et al., "A Two-antenna GPS Receiver Integrated with Dead Reckoning Sensors", ION Institute of Navigation, Proceedings of the IAIN Work Congress and the 56th Annual Meeting of the Institute of Navigation, Jun. 26-28, 2000, 4 pages.

Lei, Yu , et al., "Prediction of Navigation Satellite Clock Bias by Gaussian Process Regression", Lecture Notes in Electrical Engineering 342:411-423, Jan. 2015.

Li, T., et al., "Some remarks on GNSS integer ambiguity validation methods", Survey Review, Dec. 5, 2012, vol. 44, No. 326.

Lin, Ming , et al., "Robust Gaussian Process Regression for Real-Time High Precision GPS Signal Enhancement", www.gps.gov/systems/gps/performance/accuracy, Jun. 5, 2019.

(56) References Cited

OTHER PUBLICATIONS

Liu, Haiying, et al., "A closed-loop EKF and multi-failure diagnosis approach for cooperative GNSS positioning", Engineering, GPS Solutions, Published 2015.
Madrid, Navarro, et al., "New Approach for Integrity Bounds Computation Applied to Advanced Precise Positioning Applications", Proceedings of the 28th International Technical Meeting of the Satellite Division of The Institute of Navigation (ION GNSS+ 2015) Sep. 14-18, 2015, Tampa Convention Center, Tampa, Florida.
Meng, Xiaoli, et al., "A Robust Vehicle Localization Approach Based on GNSS/IMU/DMI/LiDAR Sensor Fusion for Autonomous Vehicles", Sensors, 2017, 17, 2140.
Odijk, Dennis, et al., "On the estimability of parameters in undifferenced, uncombined GNSS network and PPP-RTK user models by means of S-system theory", Journal of Geodesy, Nov. 2015.
Peng, Hao, et al., "Covariance Fusion Strategy of Gaussian Processes Covariance and Orbital Prediction Uncertainty", Conference: AAS/AIAA Astrodynamics Specialist Conference, Portland, ME, Aug. 2019.
Pervan, Boris, et al., "Shaping Aviation Integrity Two RAIMs for Safety", GPS World The Business and Technology of Global Navigation and Positioning, Apr. 1, 2008.
Phelts, R. Eric, et al., "Innovation: Improving ARAIM, An approach using precise point positioning", GPS World, Jun. 13, 2020, https://www.gpsworld.com/innovation-improving-araim/.
Pullen, Sam, "Augmented GNSS: Fundamentals and Keys to Integrity and Continuity", Department of Aeronautics and Astronautics, Stanford University, Stanford, CA 94305-4035 USA, Tuesday, Sep. 20, 2011 1:30-5:00 PM Oregon Convention Center, Portland, Oregon.
Rasmussen, C.E., et al., "Gaussian Processes for Machine Learning", MIT Press, 2006, ISBN 026218253X. c 2006 Massachusetts Institute of Technology, (Year: 2006).
Rodriguez-Solano, Carlos, et al., "Protection Level of the Trimble RTX Positioning Engine for Autonomous Applications", Proceedings of the 34th International Technical Meeting of the Satellite Division of The Institute of Navigation (ION GNSS+ 2021), Sep. 20-24, 2021.
Rothacher, M., et al., "ANTEX: The Antenna Exchange Format, Version 1.4", Sep. 15, 2010, IGC International GNSS Service, https://kb.igs.org/hc/en-US/articles/216104678-ANTEX-format-description.
Satirapod, Chalermehon, "Improving the GPS Data Processing Algorithm for Precise Static Relative Positioning", School of Surveying and Spatial Information Systems The University of New South Wales Jan. 2002.
Schmid, R., et al., "Estimation of elevation-dependent satellite antenna phase center variations of GPS satellites", Journal of Geodesy (2003) 77: 440-446, May 19, 2003, DOI 10.1007/S00190-003-0339-0.
Schmid, Ralf, et al., "From Relative Absolute Antenna Phase Center Corrections", Conference: IGS Workshop and Symposium 2004.
Schmid, Ralf, "How to Use IGS Antenna Phase Center Corrections", GPS World Tech Talk, Feb. 3, 2010.
Schmitz, Martin, "RTCM State Space Representation Messages, Status and Plans", PPP-RTK & Open Standards Symposium, Mar. 12-13, 2012, Frankfurt, Germany.
Shapiro, Larry S., et al., "Rejecting Outliers and Estimating Errors in an Orthogonal-Regression Framework", Phil. Trans. R. Soc. Load. A (1995)350, 407-439. (Year:1995).
Skog, Isaac, et al., "A Low-Cost GPS Aided Inertial Navigation System for Vehicle Applications", 2005 13th European Signal Processing Conference, Sep. 4-8, 2005.
Snelson, Edward, et al., "Sparse Gaussian Process using Pseudo-inputs", NIPS'05: Proceedings of the 18th International Conference on Neural Information Processing Systems, Dec. 2005, pp. 1257-1264.
Subirana, J. Sanz, et al., "Carrier Phase Cycle-Slip Detection—Navipedia", https://gssc.esa.int/navipedia/index.php/Carrier_Phase_Cycle-Slip_Detection, published 2011.
Takasu, Tomoji, et al., "ION GNSS 2008 abstract submission Cycle slip detection and fixing by MEMS IMU/GPS Integration for mobile environment RTK-GPS", Tokyo University of Marine Science and Technology, ION GNSS 2008, abstract submission.
Teunissen, P.J.G., "GNSS Integer Ambiguity Validation: Overview of Theory and Methods", Proceedings of the ION 2013 Pacific PNT Meeting, Apr. 23-25, 2013, Marriott Waikiki Beach Resort & Spa, Honolulu, Hawaii, https://www.ion.org/publications/abstract.cfm?articleID=11030.
Teunissen, Peter J.G., et al., "Integer Aperture Estimation A Framework for GNSS Ambiguity Acceptance Testing", InsideGNSS, Mar./Apr. 2011, pp. 66-73, www.insidegnss.com.
Teunissen, P.J.G., "On the GPS widelane and its decorrelating property", Delft Geodetic Computing Centre, Journal of Geodesy (1997) 71: 577-587.
Thombre, Sarang, et al., "GNSS Threat Monitoring and Reporting: Past, Present, and a Proposed Future", The Journal of Navigation, Dec. 2017, DOI: 10.1017/S0373463317000911, https://www.researchgate.net/publication/321663256.
Titsias, Michael K., "Variational Learning of Inducing Variables in Sparse Gaussian Processes", http://proceedings.mlr.press/v5/titsias09a/titsias09a.pdf, 2009.
Urquhart, Landon, "An Analysis of Multi-Frequency Carrier Phase Linear Combinations for GNSS", Department of Geodesy and Geomatics Engineering, University of New Brunswick, Technical Report No. 263, Feb. 2009.
Urquhart, Landon, et al., "Innovation: Integrity for safe navigation", https://www.gpsworld.com/innovation-integrity-for-safe-navigation-provided-by-gnss-service/, GPS World, Feb. 12, 2020.
Van Diggelen, Frank, et al., "Google to improve urban GPS accuracy for apps", Dec. 9, 2020, Android Developers Blog.
Van Graas, Frank, et al., "Precise Velocity Estimation Using a Stand-Alone GPS Receiver", Abstract only, Journal of The Institute of Navigation, vol. 51, No. 4, Winter 2004-2005, pp. 283-292, https://www.ion.org/publications/abstract.cfm?articleID=102384.
Verhagen, S., "The GNSS integer ambiguities: Estimation and validation", Aerospace Engineering, Jan. 31, 2005.
Waserman, Eyal, et al., "A Mixed Integer Least-Squares Formulation of the GNSS Snapshot Positioning Problem", https://github.com/eyalw711/snapshot-positioning, Jun. 2, 2021.
Yang, Wenhao, et al., "An Improved Relative GNSS Tracking Method Utilizing Single Frequency Receivers", Sensors 2020, 20, 4073; doi:10.3390/s20154073 www.mdpi.com/journal/sensors, 19 pages.
Zhu, Nl, et al., "GNSS Position Integrity in Urban Environments: A Review of Literature", IEEE Transactions on Intelligent Transportation Systems, 2018, 17p., 10.1109/TITS.2017.2766768.hal-01709519.

* cited by examiner

SYSTEM AND METHOD FOR PROVIDING GNSS CORRECTIONS

CROSS-REFERENCE TO RELATED APPLICATIONS

This application claims the benefit of U.S. Provisional Application No. 63/230,960 filed 9 Aug. 2021, which is incorporated in its entirety by this reference.

TECHNICAL FIELD

This invention relates generally to the satellite positioning field, and more specifically to a new and useful system and method in the satellite positioning field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
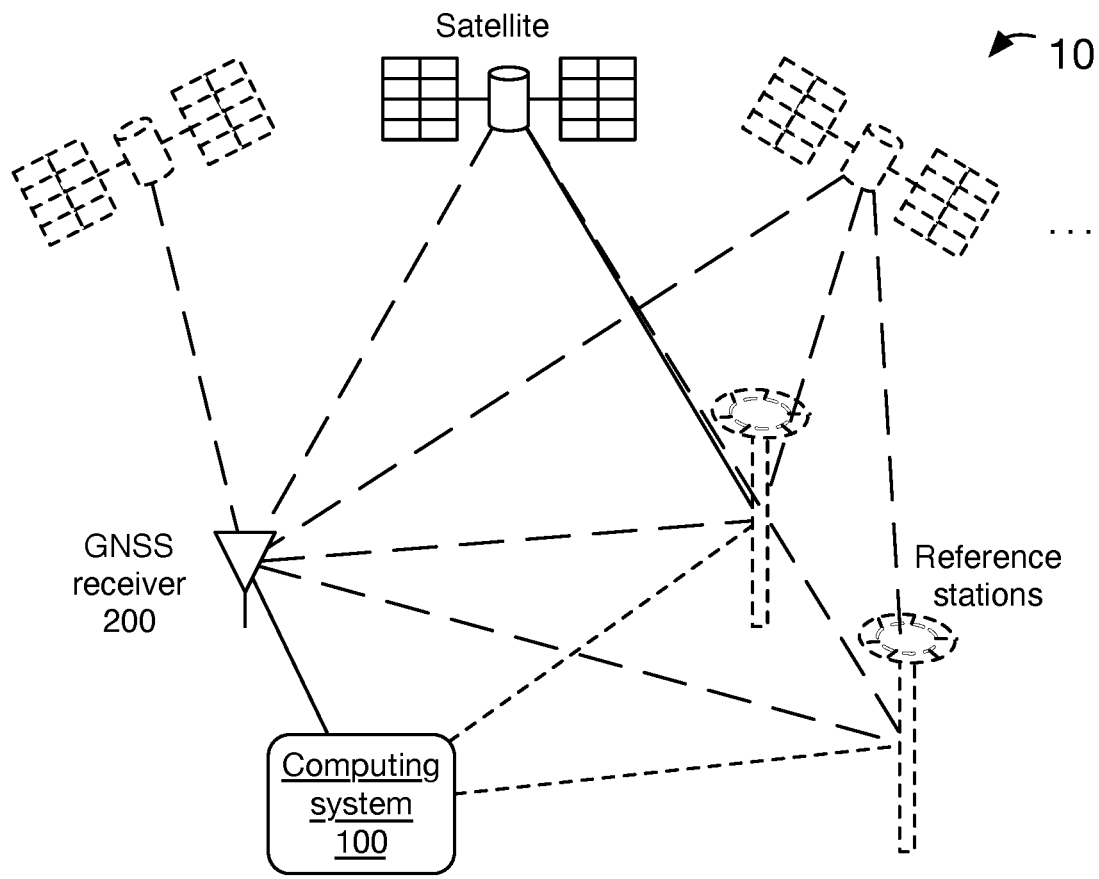
FIG. 1 is a schematic representation of the system.

As shown in FIG. 1, the system 10 can include a computing system 100 and a GNSS receiver 200. The system can optionally include and/or be in communication with one or more data sources (e.g., satellites, reference stations 300, etc.) and/or any suitable components. The computing system preferably includes a GNSS corrections service, but can include any suitable components.

Figure 2:
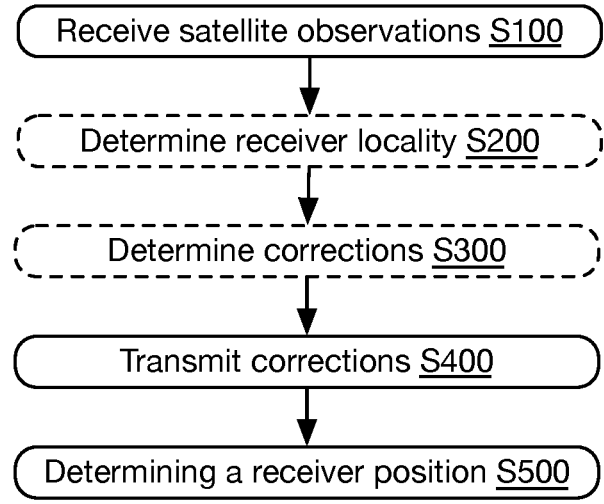
FIG. 2 is a schematic representation of the method.

As shown in FIG. 2, the method 20 can include receiving satellite observations S100, transmitting corrections S400, and determining a receiver position S500. The method can optionally include determining a receiver locality S200, determining corrections S300, and/or any suitable steps.

The system and method preferably function to determine corrections (e.g., GNSS corrections) that can be used to determine and/or refine a receiver position with a high accuracy (e.g., mm-level, cm-level, dm-level, m-level, etc.) and/or integrity (e.g., an integrity risk that is $\leq 10^{-2}$/hour, $\leq 10^{-3}$/hour, $\leq 10^{-4}$/hour, $\leq 10^{-5}$/hour, $\leq 10^{-6}$/hour, $\leq 10^{-7}$/hour, $\leq 10^{-8}$/hour, $\leq 10^{-9}$/hour, values therebetween, etc.; a protection level between about 1 cm and 10 m such as 0.01 m, 0.05 m, 0.1 m, 0.2 m, 0.5 m, 1 m, 2 m, 3 m, 5 m, 10 m, >10 m, <1 cm, etc.). However, the corrections can be otherwise used.

Embodiments of the system and/or method can be used, for example, in autonomous or semi-autonomous vehicle guidance (e.g., for unmanned aerial vehicles (UAVs), unmanned aerial systems (UAS), self-driving cars, agricultural equipment, robotics, rail transport/transit systems, autonomous trucking, last mile delivery, etc.), GPS/GNSS research, surveying systems, user devices, mobile applications, internet-of-things (IOT) devices, and/or may be used in any other suitable application. In specific examples, the system (and/or components) can be coupled to any suitable external system such as a vehicle (e.g., UAV, UAS, car, truck, etc.), robot, railcar, user device (e.g., cell phone), and/or any suitable system, and can provide positioning data, integrity data (e.g., protection level data), and/or other data to said system, wherein the system can use the data for control and/or navigation.

2. Benefits

Variations of the technology can confer several benefits and/or advantages.

First, variants of the technology resolve issues resulting from rare (or relatively rare) corrections updates. For example, by transmitting corrections (particularly antenna phase center characteristics such as phase center offset, phase center variation, etc.) to a GNSS receiver, the GNSS receiver can ensure, in most situations, that it is using the correct corrections (e.g., validated corrections, up-to-date corrections, recent corrections, etc.).

Second, variants of the technology can control (e.g., minimize, optimize, etc.) a data impact (e.g., bandwidth required, frequency of transmission, etc.) of the corrections transmission. For example, the data impact can be controlled based on which corrections are transmitted (e.g., only transmitting phase center variation data associated with a zenith or elevation angle but not transmitting variation data associated with an azimuthal angle), based on a data format (e.g., format of the corrections), based on a transmission time or frequency, and/or in any manner. In an illustrative example, to transmit corrections information associated with 20-25 satellites, a corrections service using a variant of the technology can add about 10 bits per second (e.g., 8-15 bits/s) to a corrections stream (e.g., over a rebroadcast time of about 20 minutes). Increasing the rebroadcast time could further reduce the bandwidth impact of variations of the technology.

However, variants of the technology can confer any other suitable benefits and/or advantages.

3. System

The system 10 preferably functions to disseminate GNSS corrections which can be used to improve (e.g., speed up, increase the accuracy of, increase the integrity of, etc.) the determination of a GNSS receiver position.

The system preferably uses a set of data collected by and/or from one or more data sources. Data sources can include: GNSS receivers, sensors (e.g., located onboard the receiver, the external system, the reference stations, etc.), databases, satellites, reference stations, and/or any other suitable data source. The set of data preferably corresponds to a set of satellite observations, but can additionally or alternatively include a set of sensor observations or other data.

The set of satellite observations can include orbital data (e.g., ephemeris data), timestamp, code data, carrier phase data, pseudocode data, and/or any suitable data. The set of satellite observations preferably includes satellite observations corresponding to (e.g., received from) satellites from a plurality of satellite constellations (e.g., Global Positioning System (GPS), GLObal Navigation Satellite System (GLO- NASS), BeiDou navigation satellite System (BDS), Galileo, Navigation with Indian Constellation (NavIC), Quasi-Zenith Satellite System (QZSS), GPS Aided Geo Augmented Navigation (GAGAN), etc.). However, the set of satellite observations can correspond to satellites from a single satellite constellation, can include data from an augmentation system (e.g., Satellite Based Augmentation System (SBAS) such as Wide Area Augmentation System (WAAS), European Geostationary Navigation Overlay Service (EGNOS), Multi-Functional Satellite Augmentation System (MSAS), Omnistar, StarFire, etc.; Ground Based Augmentation Systems (GBAS) such as Local Area Augmentation System (LAAS); etc.), and/or can include any suitable data.

The receiver(s) 200 preferably function to receive a set of satellite observations (e.g., satellite signals such as carrier phase and satellite code) from one or more satellites. In variants, the receiver (and/or a processing system thereof) can determine the location of the receiver (and/or external system) based on the satellite observations. The receiver is preferably in communication with the computing system. However, the receiver can be integrated with the computing system, and/or the receiver and computing system can be arranged in any suitable manner. The receiver is preferably a stand-alone device (e.g., a GNSS receiver, antenna, radome, etc.). However, the receiver can be integrated into an external system (e.g., be a component of an automobile, aero vehicle, nautical vehicle, mobile device, etc.), can be a user device (e.g., smart phone, laptop, cell phone, smart watch, etc.), and/or can be configured in any suitable manner. The receiver can be mobile (e.g., integrated into a movable external system such as a vehicle) and/or fixed (e.g., integrated into a reference or base station such as one with a known location, not moving, mot movable, held in a fixed position for a predetermined amount of time such as during surveying, etc.).

A receiver can be configured to receive satellite observations corresponding to one or more satellite constellations, to one or more carrier frequencies (e.g., the L1, L2, L5, E1, E5a, E5b, E5ab, E6, G1, G2, G3, B1, B2, B2a, B2b, B2ab, B3, LEX, etc. frequencies), and/or corresponding to any suitable source.

The computing system 100 preferably functions to determine (e.g., select, identify, etc.) GNSS corrections, update the GNSS corrections, and transmit the GNSS corrections to the receiver(s). However, the computing system can generate and/or process any suitable data and/or perform any function. The computing system is preferably coupled to the receiver(s). The computing system can be local (e.g., to a receiver, to a reference station, to an external system, etc.), remote (e.g., server, cloud, etc.), and/or distributed (e.g., between a local computing system and a remote computing system, distributed between clients, distributed between a corrections provider and a client, etc.).

The GNSS corrections are preferably used to correct one or more satellite observations. The GNSS corrections can be associated with (e.g., correspond to) individual satellites, sets of satellites, satellite constellations, individual satellite frequencies, groups of satellite (e.g., satellites of a given generation), receivers (e.g., antennas, reference stations, etc.), and/or to any data source. The GNSS corrections can depend on the satellite signal frequency, antenna properties (e.g., antenna shielding, antenna material, antenna geometry, etc.), a satellite orientation (e.g., zenith or elevation angle, azimuthal angle, etc.), satellite age or generation, and/or depend on any suitable properties. In some variations, the GNSS corrections can be derived from and/or received from a secondary data source such as from the International GNSS Service (IGS such as ANTEX corrections), from the National Geospatial-Intelligence Agency (NGA), proprietary measurements of the corrections factors, a satellite constellation operator, and/or a satellite manufacturer. However, the GNSS corrections can be derived from satellite observations and/or otherwise generated.

The GNSS corrections can be relative corrections (e.g., relative between a given satellite receiver pair, relative between satellite frequencies, etc.) and/or absolute corrections (e.g., an absolute correction associated with a satellite, an absolute correction associated with a satellite frequency, an absolute correction associated with a receiver, etc.). The GNSS corrections are preferably substantially static corrections (e.g., corrections that change slowly such as on a week, month, season, quarter, year, etc. time scale), but can be slowly varying corrections (e.g., that change on a time scale of a day), rapidly varying corrections (e.g., corrections that can change and/or be updated on a second, minute, hour, etc. time scale), and/or can be any suitable corrections. The GNSS corrections are preferably state space representations (SSR), but can be observation space representations (OSR), and/or in any representation.

Figure 4A:
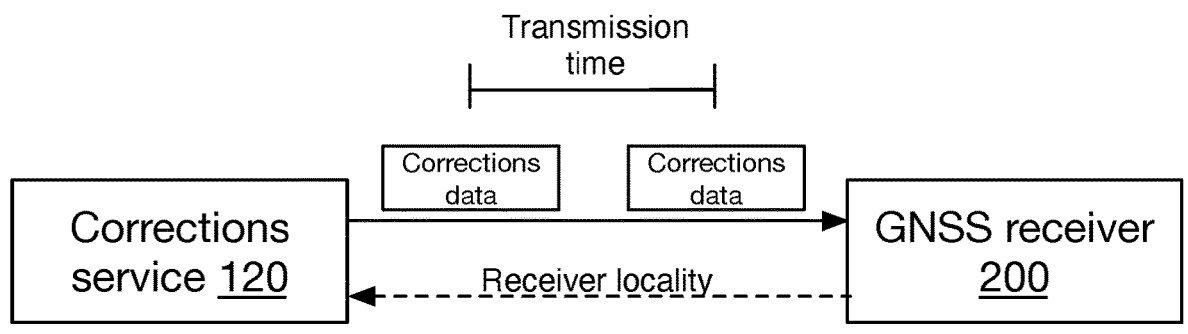
FIGS. 4A and 4B are schematic representations of examples of transmitted GNSS corrections.
Figure 4A:
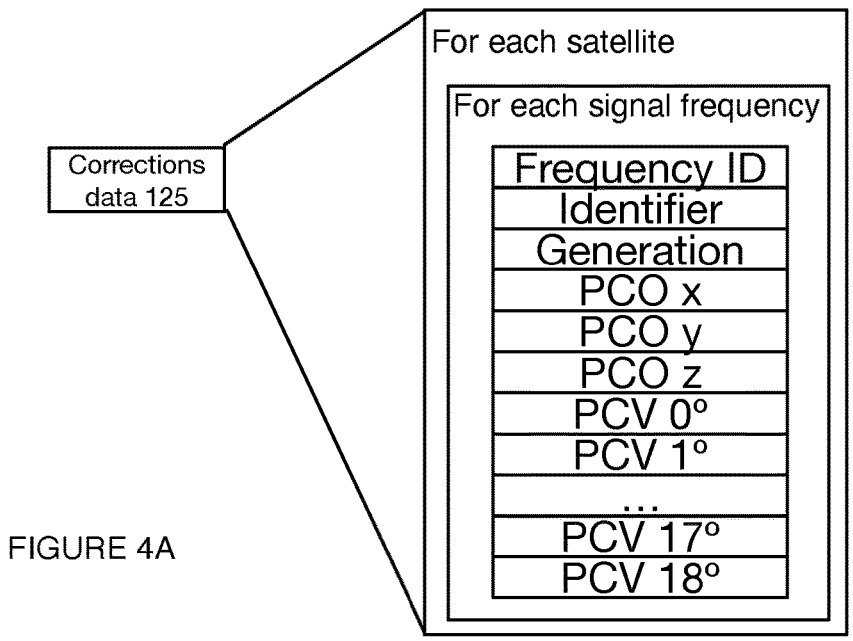
Figure 4B:
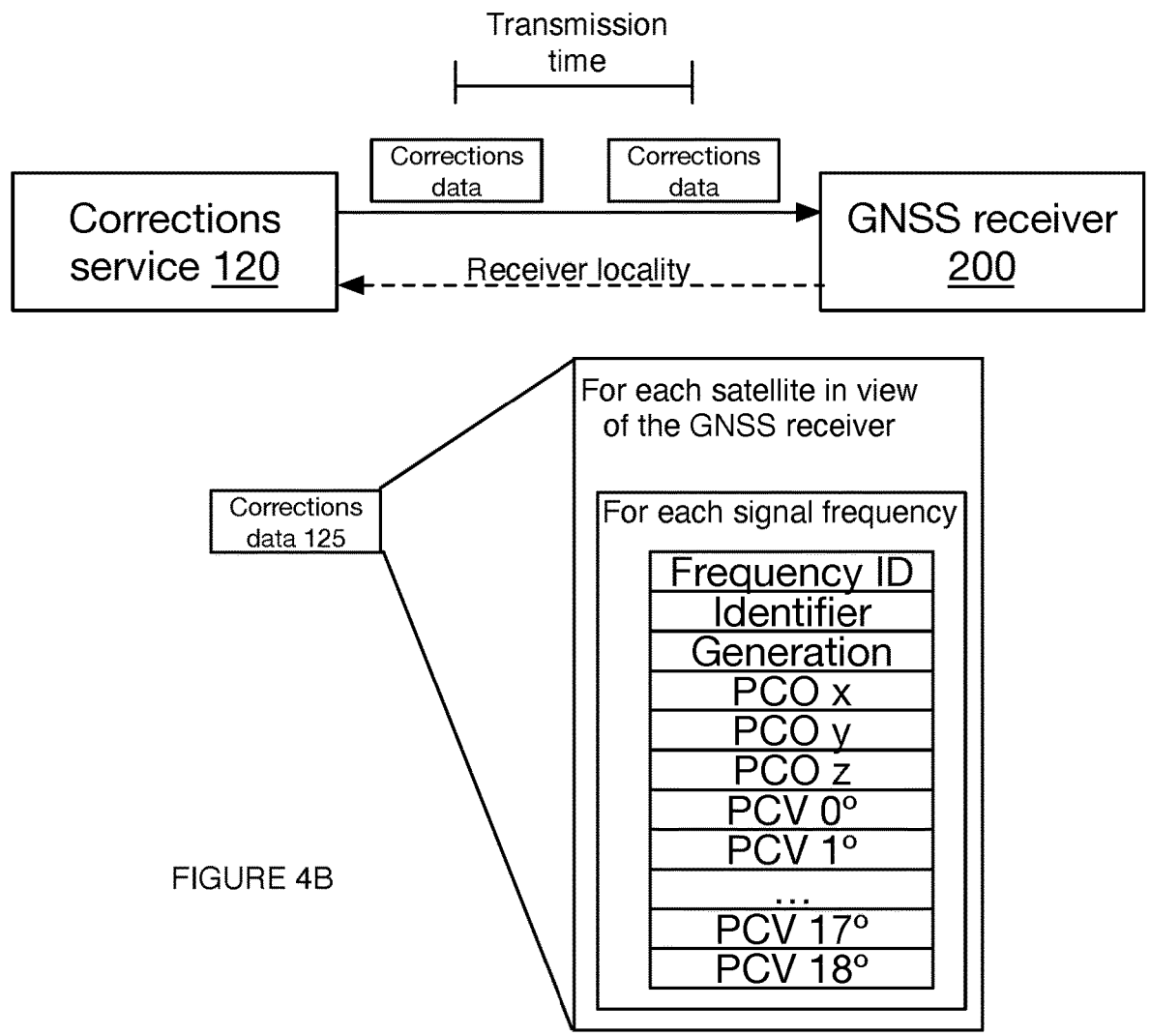
Figure 5:
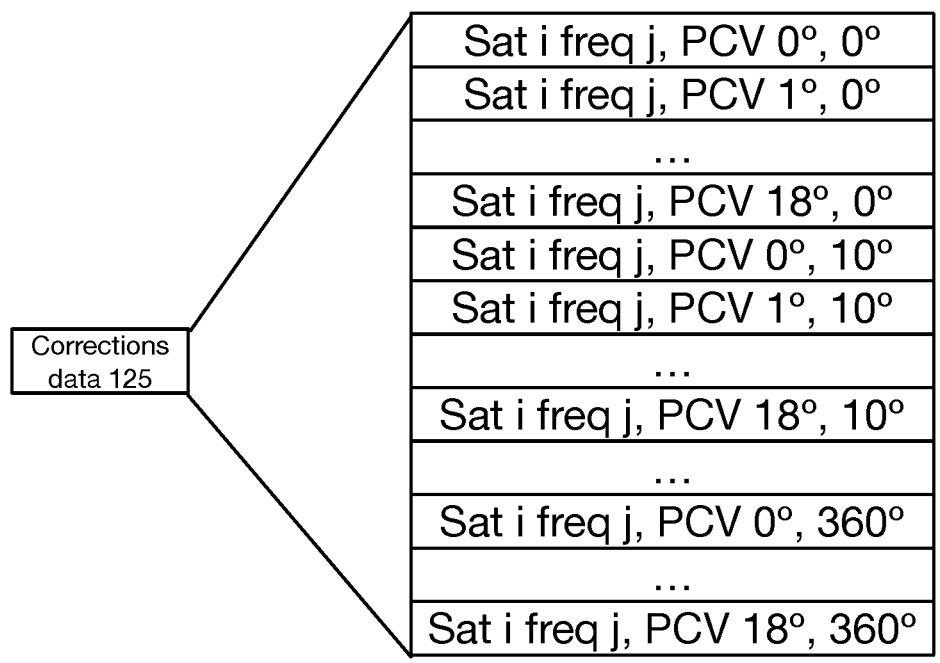
FIG. 5 is a schematic representation of an example of antenna phase center corrections information including azimuthal components.

As shown for example in FIG. 4A or FIG. 4B, the GNSS corrections 125 can include a frequency identifier (e.g., signal code, carrier frequency, channel, etc.), an identifier, a device generation, an antenna phase center (APC), auxiliary data, model information (e.g., model generation, model components, model type, model version, model validity date, static models, fundamental models, etc.), precorrections data (e.g., one or more corrections such as an SSR correction, OSR correction, orbit, clock, bias, atmospheric effect, etc. corrected for APC before transmission of the correction), and/or any suitable corrections or data.

The frequency identifier preferably identifies which satellite constellation, carrier frequency, and/or a multiplex or channel (e.g., for GPS whether the signal is associated with L1 C/A, L1 C, L1 P, L1 M, L2 P, L2 CM, L2 CL, L5 I, L5 Q, etc. code) that corrections data is associated with (e.g., valid for, relevant to, etc.). Examples of frequency identifiers include satellite code, signal frequency, channel, and/or any suitable frequency identifier can be used. The identifier (e.g., satellite identifier, receiver identifier, reference station identifier etc.) preferably functions to identify the specific data source that the corrections data is associated with. The device generation (e.g., satellite generation) preferably functions to identify which satellite or device generation the device is associated with (e.g., which can be beneficial for determining the orientation of the satellite, determining a yaw model to apply to the satellite, etc. as applied in a positioning engine). However, the signal code, identifier, and/or device generation can encode any suitable information.

Figure 3:
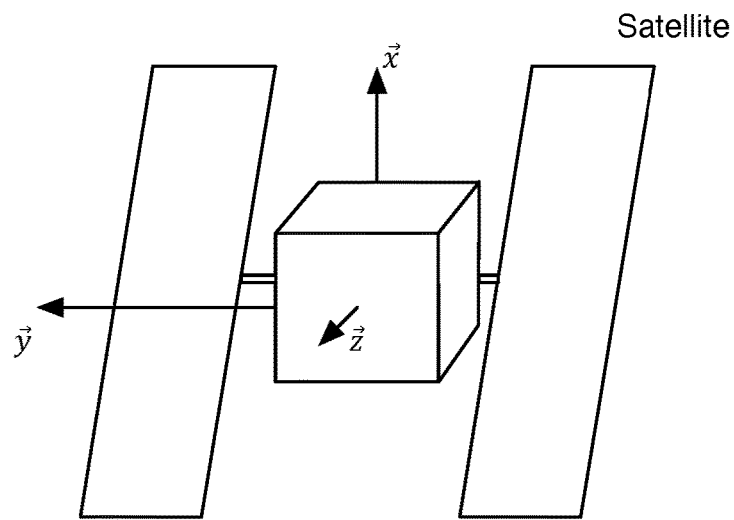
FIG. 3 is a schematic representation of an exemplary satellite coordinate system.

The APC is typically defined as the location of the antenna (e.g., receiver antenna, satellite antenna, etc.) where satellite observations are effectively transmitted from and/or received at (e.g., the effective source or detection of radiation), but APC can otherwise be defined. In a specific example, the APC can include an offset component (e.g., a phase center offset 'PCO' such as relative to a center of mass of the satellite, a geometric center of the satellite, a center of mass of the antenna, an origin of the antenna, a reference point of the antenna, a mechanical center of the antenna, etc.) and an angle dependent-component (e.g., a phase center variation 'PCV'). The PCO can include offsets in one or more of the x, y, and/or z directions (e.g., using a coordinate system such as the one shown for example in FIG. 3, using a reference point and/or axes of an antenna to define a coordinate system, etc.). The PCO is generally anisotropic (e.g., different in the x, y, and z directions), but can be isotropic (e.g., an averaged or weighted average of a true PCO in each direction). While reference is made to a cartesian coordinate system (e.g., x/y/z coordinate system), the PCO can additionally or alternatively be prepared in any suitable coordinate system (e.g., spherical coordinates, cylindrical coordinates, etc.). The PCO typically depends on a satellite, receiver, and/or transmitter geometry, but can otherwise depend on any suitable information. In a first specific example, the GNSS corrections can specify and/or include a PCO for each of the x, y, and z directions. In a second specific example, the GNSS corrections can specify and/or include a PCO for a coordinate parallel to a longitudinal axis of the antenna. The PCV can refer to an elevation angle dependence, an azimuthal angular dependence, and/or any suitable angular dependencies. The PCV typically depends on a geometry between a satellite and a receiver (e.g., a line-of-sight vector), but can depend on any suitable information. In a specific example, the PCV terms can include only terms accounting for elevation angle (sometimes referenced as a zenith angle), which can be beneficial for reducing the bandwidth of data transmitted with a small increase in error or inaccuracy (e.g., because there can be a smaller dependence of PCV values on azimuthal angle). In variants of this specific example, the PCV can be associated with a 0° azimuth, an average azimuthal angle (e.g., average data over all potential azimuthal angles, weighted average over all potential azimuthal angles such as weighted based on a likelihood of a given azimuthal angle), a most common azimuthal angle (e.g., a most frequently observed azimuthal angle), a reference azimuthal angle (e.g., a PCV value that is intermediate between the most extreme PCV values for possible azimuthal angles, a largest PCV value, a smallest PCV value, etc.). However, APC can account for elevation and azimuthal angles, azimuthal angles only (e.g., use a reference elevation angle, be for a fixed elevation angle, etc.), and/or represent any suitable contributions or components. In some variants, a subset of PCV values (e.g., PCV values associated with particular elevation angles such as those that show a variance greater than a threshold variance in the PCV value for different azimuthal angles) can include values associated with different azimuthal angles while other PCV values can be associated with a single azimuthal angle (e.g., no azimuthal angle, no azimuthal dependence on PCV, etc.).

Typical PCO values are between −5 and 5 m (e.g., −0.5-3.5 m, −1-1 m, −3-3 m, 0-4 m, etc.), but PCO values can have any suitable value (e.g., a magnitude greater than about 5 m). PCO values are preferably provided with a precision that is approximately 1 mm (e.g., a precision or accuracy between 0.5-2 mm), as this value provides a reasonable compromise on the amount of data transmitted and the quality (e.g., accuracy, precision, integrity, protection level, etc.) of a positioning solution generated using said PCO (e.g., enables a positioning accuracy of about 1 mm if the positioning estimate is limited by the APC or PCO data, ensures that a widelane correction relative to an atmospheric free or ionospheric free phase center is sufficiently accurate, etc.). For instance, by using a precision of 1 mm and spanning a range of values between −5 and 5 m, the PCO data (e.g., in each axis, in each direction, PCO vector, etc.) can be stored as a 16 bit signed integer. However, PCO values can have a precision that is less than 1 mm (e.g., 0.5 mm, 0.1 mm, 0.05 mm, 0.01 mm, 0.001 mm, etc.; as specified in the IGS ANTEX format, etc.) and/or greater than 1 mm (e.g., 2 mm, 5 mm, 10 mm, 20 mm, 50 mm, 100 mm, etc. such as for applications that do not require as high accuracy and/or integrity positioning solutions).

Typical PCV values are between −100 mm and 100 mm (e.g., −10 mm to 40 mm, −100 to 50 mm, −50 to 100 mm, 0-30 mm, −50 to 0 mm, etc.), but PCV values can have any suitable value (e.g., a magnitude greater than about 100 mm). PCV values are preferably provided with a precision that is approximately 1 mm (e.g., 0.5-2 mm), as this value provides a reasonable compromise on the amount of data to be transmitted and the quality (e.g., accuracy, precision, integrity, protection level, etc.) of the positioning solution generated using the data (e.g., enables a positioning accuracy of about 1 mm if the positioning estimate is limited by the APC or PCV data, ensures that a widelane correction relative to an atmospheric free or ionospheric free phase center is sufficiently accurate, etc.). For instance, by using a precision of 1 mm and spanning a range of values between −100 and 100 mm, the PCV data (e.g., for a given satellite, for a given azimuthal angle, etc.) can be stored as an 8 bit signed integer. However, PCV values can have a precision that is less than 1 mm (e.g., 0.5 mm, 0.1 mm, 0.05 mm, 0.01 mm, 0.001 mm, etc.; as specified in the IGS ANTEX; etc.) and/or greater than 1 mm (e.g., 2 mm, 5 mm, 10 mm, 20 mm, 50 mm, 100 mm, etc. such as for applications that do not require as high accuracy and/or integrity positioning solutions).

In general, the range of angles (e.g., range of elevation angles, range of azimuthal angles, combination of elevation angles and azimuthal angles, etc.) spanned by the PCV is determined based on (e.g., depends on, is associated with) a nadir angle between the satellite (e.g., a angle between a point of the satellite pointing to the center of the Earth and the user). The angle span can differ (e.g., for different satellite constellations and/or different satellites). For example, GPS satellites can span about 18°, Galileo satellites can span about 20°, BDS satellites can span about 15°, and GLONASS satellites can span about 16°. However, it is preferable to use the same angle span for PCV for each satellite and/or satellite constellation (e.g., to simplify the messages, corrections, data transmission, etc.). The angle span can be a fixed range, can depend on a satellite characteristic (e.g., satellite constellation, satellite generation, etc.), and/or can otherwise be determined. For example, the angle span can be about 0°-30°, 0°-10°, 0°-15°, 1°-20°, 1°, 5°, 10°, 15°, 16°, 18°, 20°, 25°, 30°, ≥30°, and/or any suitable span. In variations where the GNSS corrections include satellites associated with smaller angle ranges (e.g., when 20° is spanned, but data is only available for up to 15°), the last value can be duplicated (e.g., data for 15° can be duplicated and used for 16°-20° elevation), the values can be extrapolated (e.g., from the existing data), the data can be fit to a fit function (e.g., where the fit function can be used to determine a PCV value at higher angles), and/or the data can otherwise be produced or provided.

The PCV is preferably grouped (e.g., binned) into discrete angular contributions. For example, the PCV can be defined or determined for every 0.01°, 0.05°, 0.1°, 0.5°, 1°, 2°, 3°, 5°, 10°, <0.01°, >10°, and/or any suitable angles. When the grouping is not the same as the grouping of the underlying data (e.g., because more or less granular data is available), the data can be constrained to the bins by: interpolating the data, undersampling the data, resampling the data, extrapolating the data, and/or otherwise interpreting the data. However, the PCV can be a single value (e.g., such as an average or median value across angles), can be a function (e.g., a polynomial function, a trigonometric function, an exponential function, etc.), and/or otherwise be formatted and/or grouped. As an illustrative example, when the underlying data includes information in increments of 0.5° and the PCV data is provided in increments of 1°, the underlying data can be undersampled (e.g., sampled in the 1° increments) to provide the PCV data.

The auxiliary data preferably functions to provide additional information that can assist in the determination of the positioning solution. Examples of auxiliary data include: azimuthal PCV, orbit type (e.g., geostationary earth orbit (GEO), medium earth orbit (MEO), Inclined GeoSynchronous Orbit (IGSO), Quasi Zenith Orbit (QZO), low earth orbit (LEO), nongeostationary earth orbit, etc.), static satellite information, antenna properties (e.g., shape), update information (e.g., has the corrections data changed such as since the last transmission within a predetermined amount of time, etc.), and/or any suitable information.

The format of the GNSS corrections can be ASCII, integers (e.g., signed integers, unsigned integers, etc.), binary, and/or another format. The GNSS corrections can be used in conjunction with (and/or appended or attached to such as using a custom message) RTCM, SPARTN, CLAS, LPP, NCT, CMR, CMR+, CMRX, RTX, TSIP, NMEA, RINEX, BINEX, NTRIP, SP3, and/or other GNSS corrections protocols and/or formats. The GNSS corrections can be transmitted in plain or clear text, ciphertext (e.g., encrypted), and/or in any suitable format. For example The GNSS corrections are preferably formatted in a manner that enables symmetric ranges to be covered, but can be formatted in an asymmetric manner (e.g., to account for a greater range of potential negative and/or positive values). For example, a GNSS correction for PCO and/or PCV can enable a symmetric range of PCO and/or PCV values to be represented (e.g., from −5 to 5 m).

The GNSS corrections (e.g., the values thereof, the corrections selected for transmission, etc.) can be updated (e.g., at a predetermined time such as based on the type of correction, the intended application, the external system, the target receiver position accuracy, target receiver position integrity, etc.) and/or fixed. The corrections can be updated at predetermined times (e.g., once every 1 s, 1 min, 1 hr, 1 day, 1 week, 1 month, 1 year, etc.), responsive to a trigger (e.g., change in weather, change in temperature, change in receiver position, change in satellites in view of the receiver, change in satellites in orbit, change in frequencies used by the receiver, change in receiver location, etc.), manually (e.g., responsive to a user request for updated corrections), and/or with any suitable timing.

Figure 7:
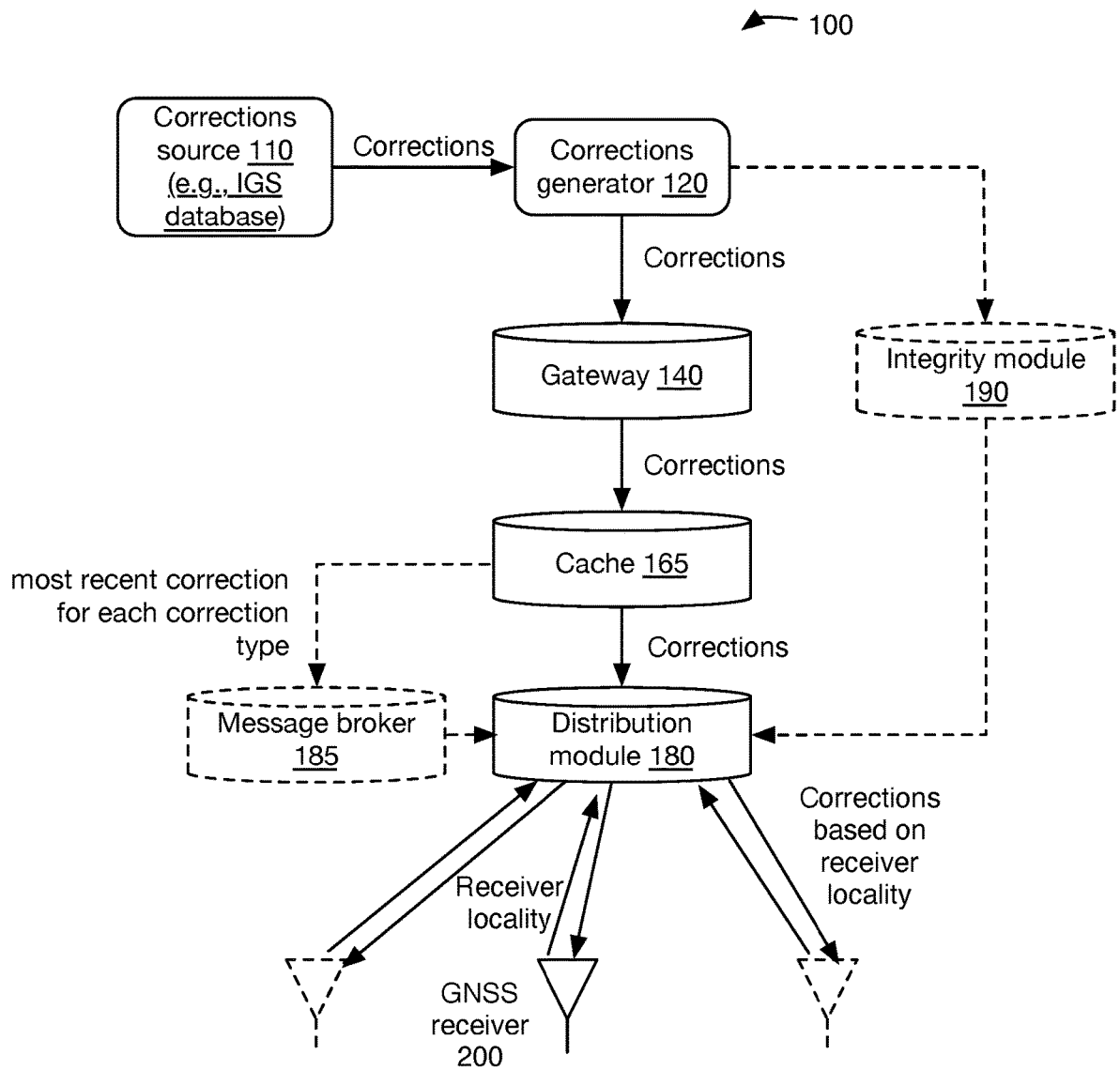
FIG. 7 is an exemplary computing system configuration.

In variants (as shown for example in FIG. 7), the computing system can include a corrections source 110, a correction generator 120 (e.g., a correction module), a gateway 140, a storage module (e.g., a cache 165), a distribution module 180 (e.g., a message broker 185), a positioning module (e.g., a positioning engine), an integrity module 190 (e.g., which can function to monitor corrections determined by the corrections generator for a predetermined event such as a change in a correction when a change is not expected, a change in a correction source, a change in a correction value, etc. where the integrity module or integrity monitor can issue a flag or warning when a probability of a predetermined event exceeds a threshold probability), and/or any suitable module(s) and/or components. Each module can be associated with an entity generating corrections, an entity operating the GNSS receiver(s), a distribution entity, a third party, and/or any suitable entity. In an illustrative example, a correction generator, a gateway, a storage module, and a distribution module can be hosted on a cloud or remote server separate from a computing system (e.g., a GNSS receiver computing system) hosting the positioning engine. In a second illustrative example, the correction generator and the gateway can be operated by a first party, the distribution module can be operated by a second party, and the positioning engine can be operated by a third party; where the first, second, and third parties can be the same and/or different. However, the correction generator, gateway, storage module, distribution module, and/or positioning module can be distributed between one or more local and one or more remote computing systems in any manner (e.g., all be hosted on the same computing system). In a specific example, a corrections system (e.g., computing system) such as one disclosed in U.S. patent application Ser. No. 17/379,271 titled 'SYSTEM AND METHOD FOR PROVIDING GNSS CORRECTIONS filed 19 Jul. 2021, which is incorporated in its entirety by this reference, can be used as part (or all) of the computing system.

The corrections source can function to provide data and/or information used to determine (e.g., estimate, determine, etc.) the corrections. The corrections source can be dependent on and/or be independent of the corrections generator (e.g., operated by an independent third party provider) and/or any other components. For instance, APC data (e.g., for each satellite, for each satellite for corrections to be provided, for each satellite constellation, etc.) can be provided by (e.g., retrieved from) IGS ANTEX files, from a proprietary APC measurement, and/or can be provided from any suitable source. In some variants, the corrections source can include one or more reference stations (e.g., satellite observations observed at said reference stations).

The corrections generator can function to determine (e.g., manipulate, modify, model, estimate, calculate, etc.) the corrections. For instance, the corrections generator can receive corrections information from the corrections source and can modify (e.g., reformat) the corrections information into a common format. As an illustrative example, when APC data with an angular separation less than 1° is provided, the corrections generator can undersample, interpolate, and/or otherwise modify the APC data such that the APC data is separated by the target angular spread. In another illustrative example, when insufficient APC data is provided (e.g., the APC data is provided up to an elevation of 15° but the corrections information is provided with greater than 15°), the corrections generator can duplicate, extrapolate, model, and/or otherwise fill in additional angular data for the APC data. However, the corrections generator can otherwise modify (e.g., extrapolate, interpolate, calculate, model, fit, undersample, duplicate, filter, transform, etc.) the corrections information received from the corrections source. In another illustrative example, the corrections generator can convert APC information from azimuthally dependent (e.g., in the received corrections information) to azimuthally independent. For instance, the corrections generator can average, select a representative or reference azimuthal angle, fit, and/or otherwise convert the APC information from azimuthally dependent to azimuthally independent. However, the corrections generator can otherwise modify (and/or feedthrough) the corrections information.

In some variants, the corrections generator can be a corrections engine and/or can generate corrections as disclosed in U.S. patent application Ser. No. 17/554,397 titled "SYSTEM AND METHOD FOR GAUSSIAN PROCESS ENHANCED GNSS CORRECTIONS GENERATION" filed 17 Dec. 2021, U.S. patent application Ser. No. 16/589,932 titled 'SYSTEMS AND METHODS FOR DISTRIBUTED DENSE NETWORK PROCESSING OF SATEL- LITE POSITIONING DATA' filed 1 Oct. 2019 and/or U.S. patent application Ser. No. 16/865,077 titled 'Systems and Methods for High-Integrity Satellite Positioning' filed 1 May 2020, each of which is incorporated in its entirety by this reference.

The gateway can function to receive (e.g., transmit, route, etc.) the GNSS corrections (and/or subsets thereof) from the correction generator (e.g., via a request, subscribed stream, API, etc.). The gateway can be hosted by a third party separate from the correction generator, can be hosted by the same party as the correction generator, and/or can be otherwise hosted. The gateway can be connected to the storage module, distribution module, and/or other module. The gateway can distribute the GNSS corrections based on metadata, receiver data, storage module information, distribution module information, and/or any suitable information.

The storage module can function to store the GNSS corrections (or subsets thereof). The storage modules can correspond to long-term (e.g., permanent) memory or short-term (e.g., transient) memory. Examples of storage modules include caches 365, buffers, databases, look-up tables, RAM, ROM, and/or any type of memory.

The distribution module preferably functions to distribute (e.g., transmit) GNSS corrections to the GNSS receiver(s) and/or a third party operator (such as an operator of the GNSS receivers). The distribution module can additionally or alternatively convert the GNSS corrections to a format usable (e.g., readable by) the GNSS receiver and/or any other functions. For example, the distribution module can receive (or determine) a corrections format from the GNSS receiver and can transmit (or process to convert and transmit) corrections in the corrections format to the GNSS receiver. The distribution module is preferably in communication with the storage module, but can be in communication with the corrections generator (e.g., to indicate a format to generate or convert the corrections to), the gateway, the GNSS receiver, and/or any module(s) and/or component(s). The GNSS corrections can be distributed automatically or manually. The GNSS corrections can be distributed at a predetermined frequency (e.g., an update frequency, a satellite observation detection frequency, etc.), at predetermined times (e.g., every 1 s, 2 s, 5 s, 10 s, 30 s, 1 min, 2 min, 5 min, 10 min, 30 min, 1 hr, 2 hrs., 4 hrs., 6 hrs., 12 hrs., 24 hrs., etc.), responsive to a trigger (e.g., a call for GNSS corrections, updated GNSS corrections, etc.), in response to GNSS correction receipt (e.g., at the gateway, at the storage module), in response to GNSS correction publication (e.g., from the storage module, from the gateway, from the message broker, etc.), and/or with any timing.

The distribution module preferably distributes the GNSS corrections based on metadata, receiver data, storage module information, gateway information, and/or any suitable information. In a first specific example, as shown for instance in FIG. 4A GNSS corrections can be distributed based on a receiver locality, where the receiver locality can be the approximate (e.g., within approximately 1 Platitude and/or 1 longitude of the actual, within approximately 500 km of the actual, etc.) position of the receiver, a geographic region that the receiver is intended to be used in, a geographic region associated with a third party user or operator of the receiver, and/or any suitable locality. The receiver locality preferably uniquely corresponds to or is associated with a geographic region (e.g., tile), but can correspond to or be associated with a plurality of geographic regions and/or any suitable geographic region(s). The receiver locality can be a coordinate, a GNSS correction region, a geocode, and/or be otherwise formatted. A receiver locality can be associated with one or more correction regions (e.g., correction regions encompassing all or a portion of the receiver locality, within a predetermined distance of the receiver locality, pre-associated with the receiver locality, geographic regions, area(s), etc.). In a second specific example, as shown for instance in FIG. 4B, the GNSS corrections can be distributed based on satellites in view of the GNSS receiver (and/or predicted to be in view of the GNSS receiver within a threshold time such as 1 min, 5 min, 10 min, 20 min, 30 min, 1 hour, 2 hours, 4 hours, etc.). In a third specific example, the GNSS corrections can be distributed for all satellites that a GNSS receiver could track (e.g., including satellites not currently in view of the GNSS receiver). However, any suitable GNSS corrections can be distributed.

The positioning engine preferably functions to determine (e.g., predict, estimate, model, etc.) the GNSS receiver kinematics (e.g., position, velocity, attitude, etc.). The positioning engine is preferably operated on a computing system collocated with the GNSS receiver (e.g., antenna), but can be operated on a computing system remote from the GNSS receiver (e.g., cloud server). The positioning engine preferably uses the corrections information (e.g., received from the distribution module, generated by the corrections generator, etc.) to correct satellite observations made by the GNSS receiver in determining the GNSS receiver position. The positioning engine can, for instance, determine the GNSS receiver kinematics by determining a set of floating integer phase hypotheses associated with a carrier phase of the corrected satellite signals (e.g., using a filter such as a Kalman filter), determining a set of integer phase ambiguity hypotheses using an integer search algorithm (e.g., LAMBDA, MLAMBDA, etc.), and performing hypothesis testing (e.g., a ratio test, Bayesian testing, determining a ratio between likelihoods of two integer phase ambiguity hypotheses, etc.) on the set of integer phase ambiguity hypotheses, wherein the hypothesis testing comprises, where a set of integer phase ambiguities that pass the hypothesis test are used to determine the kinematic parameters (e.g., receiver position, PVA solution, receiver velocity, etc.). However, the positioning engine can otherwise use the corrections information and/or determine the GNSS receiver kinematics (e.g., by leveraging the integer nature of the carrier phase ambiguity without explicitly resolving the carrier phase ambiguity, using a floating solution for the carrier phase ambiguity, etc.).

4. Method

The method preferably functions to determine (e.g., select, route, etc.) GNSS corrections, transmit GNSS corrections, and/or estimate (e.g., calculate, determine) a receiver position (e.g., by leveraging or using the GNSS corrections). Steps and/or substeps of the method can be performed iteratively (e.g., for different epochs, for the same epoch, etc.), sequentially, and/or in any suitable order. The steps and/or substeps of the method can be performed in series and/or in parallel. The steps and/or substeps are preferably performed by a system as described above, but can be performed by any system.

Receiving the satellite observations S100 functions to measure and/or detect a set of satellite signals, where each satellite signal is associated with a satellite. The satellite observations can be received at a reference station, a GNSS receiver, a computing system (e.g., where satellite observations can be stored and/or retrieved from a database), and/or at any suitable endpoint.

Determining the receiver locality S200 preferably functions to determine an approximate receiver location. The receiver locality is preferably within about 100 km (e.g., within or less than 0.1 km, 1 km, 10 km, 100 km, etc.) of the actual receiver position, but can be greater than 100 km from the actual receiver position. The receiver locality can be: coordinates, a tile identifier, a grid point identifier (and/or nearest grid point), or other identifier. The receiver locality can be determined by the receiver, a computing system (e.g., a local computing system, a remote computing system, etc.), and/or by any component. Determining the receiver locality can additionally or alternatively include determining the receiver kinematics (such as receiver velocity, receiver attitude, etc.) where the receiver kinematics can be used in addition to or alternatively to the receiver locality and/or any suitable steps.

The receiver locality can be determined from (or based on) a nearest cellular tower, cellular tower trilateration, a WIFI signal, the last known receiver position, a satellite connection (e.g., satellite network), computer vision (e.g., to identify objects in the environment of the receiver), user input, reference station signal (e.g., a nearest reference station), a transponder signal, a previous receiver position (e.g., determined from a previous iteration of the method, receiver position calculated from the satellite observations without convergence, receiver position calculated from the satellite observations without validation, receiver position calculated from the satellite observations such as using pseudorange to calculate an approximate receiver location, receiver position determined prior to an outage, etc.), receiver position estimated based on or using inertial navigation (e.g., dead reckoning), receiver position estimated based on or using pilotage, receiver position estimated based on or using celestial navigation, receiver position estimated based on or using inertial navigation (e.g., dead reckoning), receiver position estimated based on or using radio navigation (e.g., LORAN-C, Omega, Tacan, US Army Position Location and Reporting System, etc.), and/or can be otherwise determined.

Determining GNSS corrections S300 functions to determine a set of GNSS corrections that can be used to estimate a receiver position and/or correct the set of satellite observations. The GNSS corrections are preferably determined by a computing system (e.g., a corrections service, a remote computing system, a receiver computing system, etc.), but can be determined by any suitable component. The corrections are preferably determined (e.g., selected) based on the receiver locality and/or satellites that are in the line-of-sight of the receiver. The corrections are preferably determined based on corrections information (e.g., received from a corrections source), but can be modeled (e.g., based on satellite observations, based on reference station observations, etc.), and/or can otherwise be determined.

In a first variant, the receiver locality (e.g., determined in S200) can be transmitted to a corrections service where the corrections service can estimate which satellites are in view of the receiver. In a second variant, a receiver can transmit an identifier indicating which satellites are in view of the receiver. However, any suitable correction can be determined.

In some variations, corrections associated with a frequency for a satellite can be included in the GNSS corrections. In these variations, corrections for other frequencies (of the same satellite) can be derived from and/or determined based on the corrections for the included frequency.

Transmitting the GNSS corrections S400 functions to transmit the GNSS corrections to the receiver. Only the GNSS corrections associated with satellites in view of the receiver (e.g., as determined in S300) are preferably transmitted. However, additionally or alternatively, GNSS corrections associated with satellites expected to come in view of the receiver, a subset of the GNSS corrections (e.g., only PCO data, PCV data, corrections associated with particular satellite constellations, a predetermined number of satellites, etc.) associated with satellites in view of the receiver, GNSS corrections associated with all satellites (e.g., all satellites trackable by the GNSS receiver), GNSS corrections based on a predetermined region (e.g., area), and/or any corrections or data can be transmitted. The GNSS corrections are preferably transmitted from the computing system (e.g., the corrections service) to the receiver, but can be transmitted between any two endpoints.

The GNSS corrections can be transmitted automatically (e.g., on a schedule), semi-automatically (e.g., responsive to a trigger such as an update to a correction, an update to a correction within the receiver tile(s), a change in the receiver tile, etc.), in response to correction receipt request, manually (e.g., responsive to a user input), and/or in any manner. The GNSS corrections can be transmitted at predetermined times or frequencies (e.g., every 1 s, 2 s, 5 s, 10 s, 20 s, 30 s, 45 s, 60 s, 2 min, 3 min, 5 min, 10 min, 20 min, 30 min, 45 min, 60 min, etc.), based on a receiver locality (e.g., when the receiver locality crosses a boundary between receiver tiles, when a receiver locality changes by at least a threshold distance, etc.), when the corrections are updated (e.g., when a new correction has been determined), when the set of satellites changes (e.g., when a new satellite is in the line-of-view of the receiver, when a satellite leaves the line-of-view of the receiver, etc.), upon connection between the receiver and computing system (e.g., on system start-up, after recovering from a and/or with any timing and/or based on any information.

In some variations, the GNSS corrections can be used to determine or detect a predetermined event (e.g., a fault, data link threats, etc.) in the data transmission (e.g., as disclosed in U.S. patent application Ser. No. 17/022,924 titled 'SYSTEMS AND METHODS FOR HIGH-INTEGRITY SATELLITE POSITIONING' filed 16 Sep. 2020, which is incorporated in its entirety by this reference). For example, as the APC data is not expected to change, any change or missing information can be used as a potential indication of a data link threat.

Determining the receiver position S500 functions to determine the GNSS receiver position to high accuracy (e.g., receiver position is known to within 1 mm, 2 mm, 5 mm, 1 cm, 2 cm, 5 cm, 1 dm, 2 dm, 5 dm, 1 m, 2 m, 5 m, 10 m, etc.) and/or with high integrity (e.g., total integrity risk $\leq 1\times10^{-4}$/hr, $\leq 1\times10^{-5}$/hr, $\leq 1\times10^{-6}$/hr, $\leq 1\times10^{-7}$/hr, $\leq 1\times10^{-8}$/hr, etc.). The receiver position is preferably determined by the GNSS receiver (e.g., a computing system thereof, a positioning engine, etc.), but can be determined by the computing system and/or any component. Determining the receiver position can include: determining a carrier phase ambiguity (e.g., a float carrier phase ambiguity, an integer carrier phase ambiguity, etc.), determining a baseline vector between a receiver and a reference station, determining an absolute receiver position (e.g., by applying the baseline vector to the reference station location), and/or any steps. The receiver position can be determined using an estimator and/or any suitable method. Exemplary estimators include: Kalman filters (e.g., unscented Kalman filters, extended Kalman filters, recursive Kalman filters, etc.), particle filters (e.g., monte carlo simulations), a least squares solution (e.g., an iterative snapshot least squares method), a Gaussian process, and/or any suitable estimator can be used.

Determining the receiver position can include correcting the set of satellite observations (observed by the receiver) based on the GNSS corrections, which can function to decrease and/or remove the impact of errors on the satellite observations (e.g., to improve an accuracy and/or precision of the determined receiver position, velocity, etc.).

In variants, the receiver position and/or protection level can be transmitted to an external system, stored (e.g., cached), used to operate and/or control an external system, used to generate operation instructions for an external system (e.g., using a GNSS receiver computing system, an external system computing system, etc.), and/or used in any manner.

Figure 6:
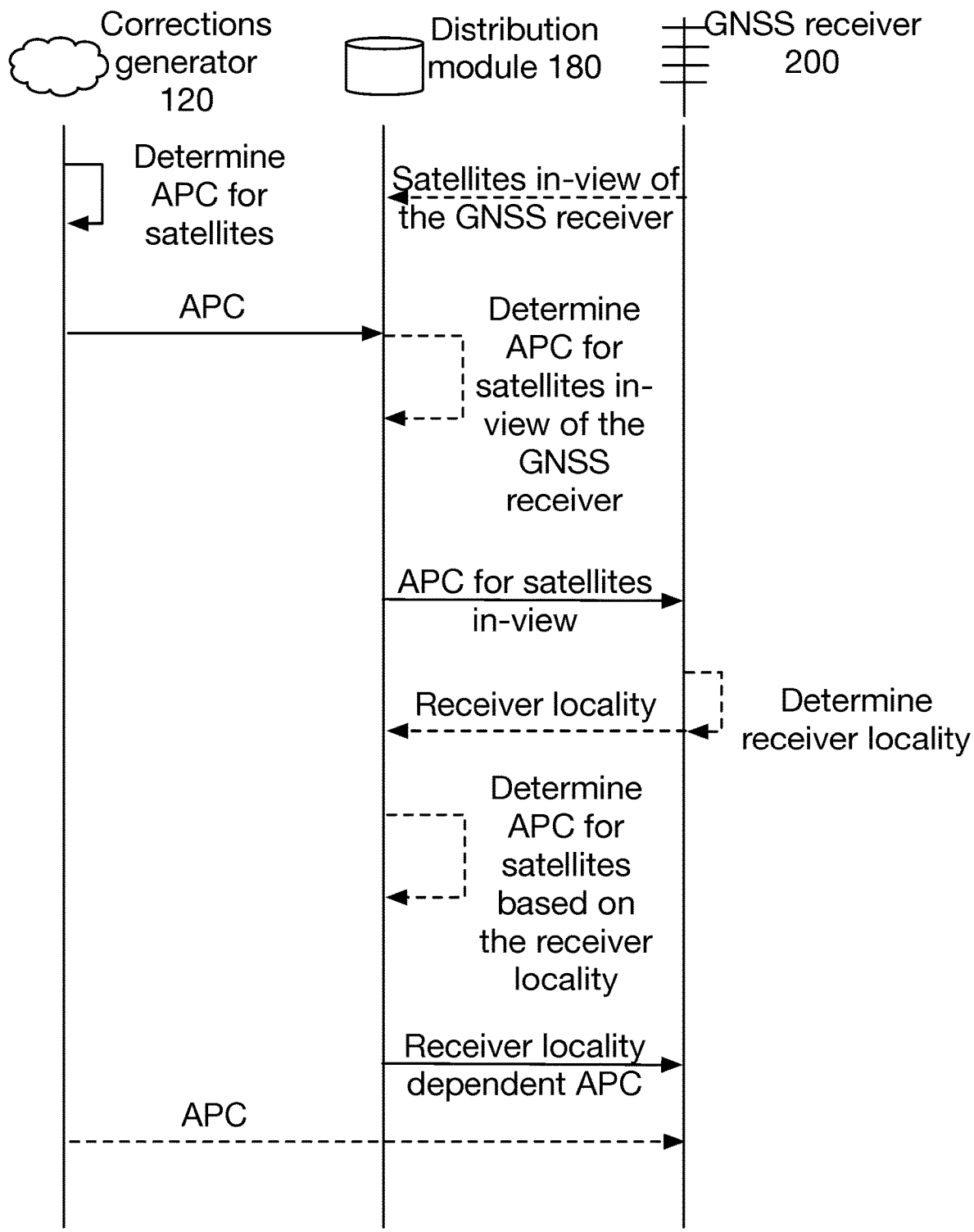
FIG. 6 is an example flow diagram for examples of information transmitted between potential endpoints.

In an illustrative example, a corrections message for a GNSS receiver can include: for each satellite (e.g., each satellite in-view of the GNSS receiver, each satellite predicted to be in-view of the GNSS receiver within at least one rebroadcast period, each satellite associated with a predetermined region or area, each satellite associated with a satellite network or constellation, each satellite trackable by the GNSS receiver, etc.) a signal code (e.g., satellite constellation and/or frequency of the APC data), a satellite number (e.g., a constellation specific satellite identifier), a satellite generation (e.g., a generation of the respective satellite where a positioning engine can determine a satellite orientation or satellite orientation model based on the satellite generation), a phase center offset (e.g., a PCO value for x, y, and/or z directions, with a precision of about 1 mm and a range of about −5 to 5 m), a phase center variation (e.g., only elevation dependent variations in the phase center such as in 1° bins with a bin range of about 20° with precision of about 1 mm and a range of about −0.1 to 0.1 m; elevation and azimuth dependent variations in the phase center; etc.), and/or auxiliary information (e.g., static satellite information such as orbit type). However, the corrections message can include any suitable information. The corrections message can be generated by a corrections generator based on corrections information received from a corrections source. The corrections message can be transmitted directly to a GNSS receiver, can be transmitted to a distribution module (e.g., which can then transmit the corrections message or a subset thereof to the GNSS receiver, as shown for example in FIG. 6), and/or can otherwise be transmitted to and/or generated by a GNSS receiver. In some variations, corrections information for all satellites can be transmitted to a distribution module where the distribution module can transmit the corrections information needed and/or requested by a particular GNSS receiver (e.g., based on GNSS receiver locality, GNSS receiver area, satellites tracked, etc.).

The methods of the preferred embodiment and variations thereof can be embodied and/or implemented at least in part as a machine configured to receive a computer-readable medium storing computer-readable instructions. The instructions are preferably executed by computer-executable components integrated with a system for GNSS PVT generation. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A system for disseminating GNSS corrections information comprising:
a GNSS receiver coupled to a GNSS antenna wherein the GNSS antenna receives observations from a plurality of in-view satellites;
a positioning engine operating on a computing system collocated with the GNSS antenna; and
a corrections generator operating on a computing system remote from the GNSS antenna,
wherein the corrections generator is configured to transmit antenna phase center corrections to the positioning engine,
wherein the positioning engine is configured to determine a set of corrected satellite observations based on the antenna phase center corrections and determine a high accuracy position of the GNSS antenna based on the set of corrected satellite observations,
wherein the antenna phase center corrections are rebroadcast to the positioning engine with a time period less than an update time period for changing the antenna phase center corrections.

2. The system of claim 1, wherein the antenna phase center corrections comprise an antenna phase center correction for each satellite in-view of the GNSS antenna.

3. The system of claim 2, wherein the antenna phase center corrections comprise a satellite generation for each of the satellites in-view of the GNSS antenna, wherein the positioning engine is configured to determine a yaw model for determining an orientation of a satellite in-view of the GNSS receiver based on the satellite generation associated with the respective satellite.

4. The system of claim 2, wherein the antenna phase center comprises a phase center offset for each of the satellites in-view of the GNSS antenna.

5. The system of claim 4, wherein each phase center offset is stored with a precision of 1 mm, wherein a range of potential values for each phase center offset is between −5 m and 5 m.

6. The system of claim 4, wherein the antenna phase center further comprises a plurality of phase center variations for each of the satellites in-view of the GNSS antenna.

7. The system of claim 6, wherein each phase center variation of the plurality of phase center variations is associated with a different elevation angle.

8. The system of claim 7, wherein the different elevation angles differ by 10, wherein the different elevation angles are between 00 and 18°.

9. The system of claim 6, wherein each of the phase center variations comprises a precision of 1 mm.

10. The system of claim 6, wherein a number of phase center variations is the same for satellites in-view of the GNSS antenna associated with different satellite constellations.

11. A method for disseminating antenna phase center (APC) corrections comprising:
- receiving a set of satellite observations at a GNSS receiver via a GNSS antenna from a plurality of in-view satellites;
- transmitting, from a cloud computing system to a positioning engine collocated with the GNSS receiver, the APC corrections associated with the plurality of in-view satellites to the GNSS receiver,
- wherein the APC corrections comprise, for each satellite of the plurality of in-view satellites:
  - a phase center offset (PCO) in an x, a y, and a z coordinate;
  - a phase center variation (PCV) for a plurality of elevation angles; and
- at the positioning engine, determining a set of corrected satellite observations based on the APC corrections and determining a position of the GNSS receiver based on the set of corrected satellite observations;
- wherein the APC corrections are retransmitted after a retransmission time, wherein the retransmission time is at least 20 minutes.

12. The method of claim 11, wherein the APC corrections further comprise, for each satellite of the plurality of in-view satellites:
- a signal code comprising a satellite constellation and a frequency associated with the PCO and the PCV for the respective satellite;
- a satellite identifier; and
- a satellite generation.

13. The method of claim 12, wherein the positioning engine determines a satellite geometry for a satellite based on the satellite generation.

14. The method of claim 11, wherein the PCV for each satellite of the plurality of in-view satellites is independent of azimuthal angle.

15. The method of claim 11, wherein each PCO comprises a precision of 1 mm, wherein a range of potential values for each PCO is between −5 meters (m) and 5 m.

16. The method of claim 15, wherein each PCV comprises a precision of 1 mm, wherein a range of potential values for each PCV is between −0.1 m and 0.1 m.

* * * * *